United States Patent
Takeuchi et al.

(10) Patent No.: US 11,872,540 B2
(45) Date of Patent: Jan. 16, 2024

(54) EXHAUST GAS PURIFICATION CATALYST COMPOSITION AND EXHAUST GAS PURIFICATION CATALYST

(71) Applicant: MITSUI MINING & SMELTING CO., LTD., Tokyo (JP)

(72) Inventors: Ryo Takeuchi, Saitama (JP); Hironori Iwakura, Saitama (JP); Shogo Sano, Saitama (JP); Yusuke Hosoi, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 17/780,400

(22) PCT Filed: Nov. 27, 2020

(86) PCT No.: PCT/JP2020/044288
§ 371 (c)(1),
(2) Date: May 26, 2022

(87) PCT Pub. No.: WO2021/107119
PCT Pub. Date: Jun. 3, 2021

(65) Prior Publication Data
US 2022/0401923 A1    Dec. 22, 2022

(30) Foreign Application Priority Data
Nov. 28, 2019    (JP) .................................. 2019-215452

(51) Int. Cl.
*B01J 23/10*    (2006.01)
*B01D 53/86*    (2006.01)
*B01J 21/06*    (2006.01)
*B01J 23/38*    (2006.01)

(52) U.S. Cl.
CPC ............ *B01J 23/10* (2013.01); *B01D 53/864* (2013.01); *B01D 53/8628* (2013.01); *B01J 21/066* (2013.01); *B01J 23/38* (2013.01)

(58) Field of Classification Search
CPC .......... B01J 23/10; B01J 21/066; B01J 23/38; B01D 53/8628; B01D 53/864
See application file for complete search history.

(56) References Cited

U.S. PATENT DOCUMENTS

| | | | |
|---|---|---|---|
| 9,931,614 B2 | 4/2018 | Morikawa et al. | |
| 9,962,684 B2 | 5/2018 | Hayashida et al. | |
| 2014/0037524 A1 | 2/2014 | Mikita et al. | |
| 2015/0209760 A1 | 7/2015 | Asanuma et al. | |
| 2016/0121302 A1 | 5/2016 | Morikawa et al. | |
| 2016/0250620 A1 | 9/2016 | Morikawa et al. | |
| 2016/0288096 A1 | 10/2016 | Fujiwara et al. | |
| 2017/0072386 A1 | 3/2017 | Hayashida et al. | |
| 2017/0348674 A1 | 12/2017 | Suzuki et al. | |
| 2018/0065111 A1 | 3/2018 | Saito et al. | |
| 2018/0236401 A1 | 8/2018 | Chinzei et al. | |

FOREIGN PATENT DOCUMENTS

| | | |
|---|---|---|
| CN | 103442804 A | 12/2013 |
| CN | 105339308 A | 2/2016 |
| CN | 105899463 A | 8/2016 |
| CN | 107106981 A | 8/2017 |
| CN | 107790119 A | 3/2018 |
| JP | 3789231 B2 | 6/2006 |
| JP | 2015-818 A | 1/2015 |
| JP | 2015-93267 A | 5/2015 |
| JP | 2015-182932 A | 10/2015 |
| WO | 2016092860 A1 | 6/2016 |

OTHER PUBLICATIONS

International Search Report (ISR) dated Feb. 2, 2021 filed PCT/JP2020/044288.
PCT Notification of Transmittal of Translation of the International Preliminary Report on PA Tentability and Written Opinion of the International Searching Authority dated Feb. 2, 2021 filed in PCT/JP2020/044288.

*Primary Examiner* — James A Fiorito
(74) *Attorney, Agent, or Firm* — RANKIN, HILL & CLARK LLP

(57) ABSTRACT

An object of the present invention is to provide an exhaust gas purification catalyst composition and an exhaust gas purification catalyst, each of which includes a pyrochlore-type $CeO_2$—$ZrO_2$-based complex oxide having an improved oxygen storage capacity (particularly, an improved oxygen storage capacity after being exposed to a high temperature environment), and, in order to achieve the above-mentioned object, the present invention provides an exhaust gas purification catalyst composition and an exhaust gas purification catalyst, each of which contains a pyrochlore-type $CeO_2$—$ZrO_2$-based complex oxide that contains Y and Mg and thus exhibits an excellent oxygen storage capacity (particularly, an excellent oxygen storage capacity after being exposed to a high temperature environment).

15 Claims, No Drawings

EXHAUST GAS PURIFICATION CATALYST COMPOSITION AND EXHAUST GAS PURIFICATION CATALYST

BACKGROUND OF THE INVENTION

Field of the Invention

The present invention relates to an exhaust gas purification catalyst composition and an exhaust gas purification catalyst, each of which includes a pyrochlore-type $CeO_2$—$ZrO_2$-based complex oxide.

Background Art

Exhaust gas emitted from an internal combustion engine of an automobile, a motorcycle or the like contains harmful components, such as hydrocarbons (THC), carbon monoxide (CO) and nitrogen oxide (NOx). As an exhaust gas purification catalyst that purifies and detoxifies these harmful components, a three-way catalyst having a catalytic activity to oxidize THC and convert it to water and carbon dioxide, to oxidize CO and convert it to carbon dioxide, and to reduce NOx and convert it to nitrogen, has been used.

To mitigate fluctuations in oxygen concentration in exhaust gas and to efficiently purify THC, CO, NOx and the like, a material having an oxygen storage capacity (OSC), such as $CeO_2$—$ZrO_2$-based complex oxides, has been used as a constituent material of an exhaust gas purification catalyst.

It is known that, as a $CeO_2$—$ZrO_2$-based complex oxide, there is a pyrochlore-type $CeO_2$—$ZrO_2$-based complex oxide in addition to a fluorite-type $CeO_2$—$ZrO_2$-based complex oxide (see, for example, Patent Documents 1 and 2).

The pyrochlore-type $CeO_2$—$ZrO_2$-based complex oxide has a structure in which one oxygen atom is missing and in which Ce and Zr atoms are regularly and alternately arranged, differing from the fluorite-type $CeO_2$—$ZrO_2$-based complex oxide, and thus has an excellent Redox property in conversion to and from $Ce_2O_3$ and $CeO_2$ associated with fluctuations in oxygen concentration. In other words, in the pyrochlore-type $CeO_2$—$ZrO_2$-based complex oxide, the valence of Ce changes from trivalent to tetravalent in an oxidizing atmosphere containing a relatively large amount of $O_2$, and Ce absorbs oxygen; in a reducing atmosphere containing relatively large amounts of CO and THC, on the other hand, the valence of Ce changes from tetravalent to trivalent and Ce releases oxygen. Therefore, by using the pyrochlore-type $CeO_2$—$ZrO_2$-based complex oxide as a constituent material of an exhaust gas purification catalyst, it is possible to mitigate fluctuations in the composition of exhaust gas in the vicinity of a noble metal element such as Pt, Pd or Rh, which is a catalytically-active component, and to effectively purify the exhaust gas. Therefore, the pyrochlore-type $CeO_2$—$ZrO_2$-based complex oxide is useful as a co-catalyst for an exhaust gas purification catalyst.

CITATION LIST

Patent Documents

Patent Document 1: JP 2015-093267 A
Patent Document 2: JP 2015-182932 A

SUMMARY OF THE INVENTION

Technical Problem

A further improvement in the oxygen storage capacity of the pyrochlore-type $CeO_2$—$ZrO_2$-based complex oxide has been demanded. Since an exhaust gas purification catalyst is repeatedly exposed to a high temperature environment, in particular, an improvement in the oxygen storage capacity of the pyrochlore-type $CeO_2$—$ZrO_2$-based complex oxides after being exposed to a high temperature environment has been demanded.

Therefore, an object of the present invention is to provide an exhaust gas purification catalyst composition and an exhaust gas purification catalyst, each of which includes a pyrochlore-type $CeO_2$—$ZrO_2$-based complex oxide having an improved oxygen storage capacity (particularly, an improved oxygen storage capacity after being exposed to a high temperature environment).

Solution to Problem

The present inventors have found out that it is possible to improve the oxygen storage capacity (particularly, the oxygen storage capacity after being exposed to a high temperature environment) of a pyrochlore-type $CeO_2$—$ZrO_2$-based complex oxide, by incorporating Y (yttrium element) and Mg (magnesium element) to the pyrochlore-type $CeO_2$—$ZrO_2$-based complex oxide, thereby completing the present invention.

Thus, the exhaust gas purification catalyst composition according to the present invention is characterized by including: a pyrochlore-type $CeO_2$—$ZrO_2$-based complex oxide containing Y and Mg; and a catalytically-active component.

Further, the exhaust gas purification catalyst according to the present invention is characterized by including: a pyrochlore-type $CeO_2$—$ZrO_2$-based complex oxide containing Y and Mg; and a catalytically-active component supported on the pyrochlore-type $CeO_2$—$ZrO_2$-based complex oxide.

Advantageous Effects of Invention

The present invention provides an exhaust gas purification catalyst composition and an exhaust gas purification catalyst, each of which includes a pyrochlore-type $CeO_2$—$ZrO_2$-based complex oxide having an improved oxygen storage capacity (particularly, an improved oxygen storage capacity after being exposed to a high temperature environment).

DETAILED DESCRIPTION OF THE INVENTION

The present invention will now be described in specific detail.

<<Exhaust Gas Purification Catalyst Composition>>

The exhaust gas purification catalyst composition according to the present invention contains a pyrochlore-type $CeO_2$—$ZrO_2$-based complex oxide containing Y and Mg (hereinafter, referred to as "pyrochlore-type $CeO_2$—$ZrO_2$-based complex oxide according to the present invention"), and a catalytically-active component.

<Pyrochlore-Type $CeO_2$—$ZrO_2$-Based Complex Oxide>

The pyrochlore-type $CeO_2$—$ZrO_2$-based complex oxide according to the present invention contains a crystal phase having a pyrochlore-type structure (hereinafter, referred to as "pyrochlore phase"). A typical composition of the pyrochlore phase is $Ce_2Zr_2O_7$. The pyrochlore phase is a crystal phase that does not precipitate unless the atomic arrangement of "—Ce—O—Zr—O—Ce—" is more regularly arranged, compared to that of a crystal phase having a fluorite-type structure (hereinafter, referred to as fluorite phase"), and the valence change of Ce is thought to be more easily activated in the pyrochlore phase, because of its high arrangement regularity.

The fact that the pyrochlore-type $CeO_2$—$ZrO_2$-based complex oxide according to the present invention contains the pyrochlore phase can be confirmed by the fact that, in a diffraction pattern obtained by a powder X-ray diffraction method (XRD) using CuKα, a peak is present in the vicinity of 2θ=14.8° (usually, 2θ=13.7 to 15.3°), and that this peak has an intensity of 0.01 or more with respect to the intensity of the main peak which is present in the vicinity of 2θ=29.3° (usually, 2θ=28.8 to 29.8°). The term "main peak" as used herein refers to the peak having the maximum intensity. In the diffraction pattern, the ratio (Ip/Im) of the intensity Ip of the peak attributed to the pyrochlore phase that is present at 2θ=13.7 to 15.3° to the intensity Im of the main peak present at 2θ=28.8 to 29.8°, is preferably 0.02 or more. When the peak intensity ratio (Ip/Im) is 0.02 or more, it can be confirmed that the pyrochlore phase is present in a preferred manner.

The pyrochlore-type $CeO_2$—$ZrO_2$-based complex oxide according to the present invention may be composed of a single phase of the pyrochlore phase, or may be composed of a mixed phase of the pyrochlore phase and one or more other phases. However, the pyrochlore-type $CeO_2$—$ZrO_2$-based complex oxide is preferably composed of a single phase of the pyrochlore phase. The other phase may be a crystal phase or an amorphous phase. The other phase may be, for example, a fluorite phase, a crystal phase derived from a production raw material, or the like. In the case where the pyrochlore-type $CeO_2$—$ZrO_2$-based complex oxide according to the present invention is composed of a mixed phase, it is preferred that the pyrochlore phase constitutes the main phase. The term "main phase" refers to a crystal phase from which the peak having the maximum intensity (namely, the main peak) is derived, in a diffraction pattern of the $CeO_2$—$ZrO_2$-based complex oxide obtained by a powder X-ray diffraction method (XRD) using CuKα. Although the main peak appears at the same diffraction angle (in the vicinity of 2θ=29.3° (usually, 2θ=28.8 to 29.8°)) regardless of the main phase being the pyrochlore phase or the fluorite phase, it can be said that the main phase is the pyrochlore phase, not the fluorite phase, when the above-described peak intensity ratio (Ip/Im) is 0.01 or more.

The pyrochlore-type $CeO_2$—$ZrO_2$-based complex oxide according to the present invention contains Y (yttrium element) and Mg (magnesium element), in addition to Ce (cerium element), Zr (zirconium element) and O (oxygen element).

The oxygen storage capacity (particularly, the oxygen storage capacity after being exposed to a high temperature environment) to be exhibited when a noble metal element such as Pt, Pd or Rh, which is a catalytically-active component, is supported on the pyrochlore-type $CeO_2$—$ZrO_2$-based complex oxide according to the present invention, is improved by the presence of Y and Mg. In other words, in the case where the amount of a noble metal element supported on a pyrochlore-type $CeO_2$—$ZrO_2$-based complex oxide containing both Y and Mg is the same as the amount of a noble metal element supported on a pyrochlore-type $CeO_2$—$ZrO_2$-based complex oxide not containing at least one of Y and M, the pyrochlore-type $CeO_2$—$ZrO_2$-based complex oxide containing both Y and Mg exhibits a superior oxygen storage capacity (particularly, a superior oxygen storage capacity after being exposed to a high temperature environment). The mechanism by which the oxygen storage capacity (particularly, the oxygen storage capacity after being exposed to a high temperature environment) is improved by incorporating Y and Mg to a pyrochlore-type $CeO_2$—$ZrO_2$-based complex oxide, is assumed as follows. A noble metal element such as Pt, Pd or Rh, which is a catalytically-active component, supported on a pyrochlore-type $CeO_2$—$ZrO_2$-based complex oxide contributes to the oxygen storage capacity of the pyrochlore-type $CeO_2$—$ZrO_2$-based complex oxide. It is thought that the incorporation of Y and Mg to the pyrochlore-type $CeO_2$—$ZrO_2$-based complex oxide enables a noble metal element to be supported on the pyrochlore-type $CeO_2$—$ZrO_2$-based complex oxide in a well dispersed manner, and enables to increase the ratio of the amount of the noble metal element that contributes to the oxygen storage capacity of the pyrochlore-type $CeO_2$—$ZrO_2$-based complex oxide, with respect to the total amount of the noble metal element supported on the pyrochlore-type $CeO_2$—$ZrO_2$-based complex oxide. Y is thought to contribute mainly to an improvement in the heat resistance of the pyrochlore-type $CeO_2$—$ZrO_2$-based complex oxide, and Mg is thought to contribute mainly to an improvement in the dispersibility of a noble metal element at the time of allowing the noble metal element to be supported on the pyrochlore-type $CeO_2$—$ZrO_2$-based complex oxide. These effects of Y and Mg together are thought to improve the oxygen storage capacity (particularly, the oxygen storage capacity after being exposed to a high temperature environment) to be exhibited when a noble metal element such as Pt, Pd or Rh, which is a catalytically-active component, is supported on the pyrochlore-type $CeO_2$—$ZrO_2$-based complex oxide.

As described above, since Mg is thought to contribute mainly to an improvement in the dispersibility of a noble metal element at the time of allowing the noble metal element to be supported on the pyrochlore-type $CeO_2$—$ZrO_2$-based complex oxide, Mg is preferably present in the surface layer of the pyrochlore-type $CeO_2$—$ZrO_2$-based complex oxide according to the present invention.

In the pyrochlore-type $CeO_2$—$ZrO_2$-based complex oxide according to the present invention, Ce, Zr and O preferably form a solid solution phase having a pyrochlore-type structure. Ce, Zr and O may also form a solid solution phase having a fluorite-type structure, and/or a single phase (a $CeO_2$ single phase or a $ZrO_2$ single phase) which is a crystal phase or an amorphous phase, in addition to a solid solution phase having a pyrochlore-type structure.

In the pyrochlore-type $CeO_2$—$ZrO_2$-based complex oxide according to the present invention, one or both of Y and Mg preferably form a solid solution phase having a pyrochlore-type structure, along with Ce, Zr and O. One or both of Y and Mg may form a solid solution phase having a fluorite-type structure, along with Ce, Zr and O. Y may form a solid solution phase along with Ce and O (for example, a solid solution phase of $CeO_2$ and $Y_2O_3$), or a solid solution phase along with Zr and O (for example, a solid solution phase of $ZrO_2$ and $Y_2O_3$), or may form a single phase (for example, a $Y_2O_3$ single phase) which is a crystal phase or an amorphous phase. Mg may form a solid solution phase along with Ce and O (for example, a solid solution phase of $CeO_2$ and MgO), or a solid solution phase along with Zr and O (for example, a solid solution phase of $ZrO_2$ and MgO), or may form a single phase (for example, a MgO single phase) which is a crystal phase or an amorphous phase.

The contents of Ce, Zr, Y and Mg in the pyrochlore-type $CeO_2$—$ZrO_2$-based complex oxide according to the present invention can be adjusted as appropriate, taking into consideration the oxygen storage capacity required for the pyrochlore-type $CeO_2$—$ZrO_2$-based complex oxide according to the present invention.

In the pyrochlore-type $CeO_2$—$ZrO_2$-based complex oxide according to the present invention, the mole percentage $R_0$ of the total content of Ce, Zr, Y and Mg to the total content of all metal elements contained in the pyrochlore-type $CeO_2$—$ZrO_2$-based complex oxide according to the present invention ($R_0$=the total molar amount of Ce, Zr, Y and Mg/the total molar amount of all metal elements×100) is preferably 80% by mole or more, more preferably 85% by mole or more, and still more preferably 90% by mole or more, from the viewpoint of further improving the oxygen storage capacity of the pyrochlore-type $CeO_2$—$ZrO_2$-based complex oxide according to the present invention. The upper limit value of $R_0$ is theoretically 100% by mole. However, the upper limit value can be practically less than 100% by mole, taking into consideration the presence of unavoidable impurities.

In the pyrochlore-type $CeO_2$—$ZrO_2$-based complex oxide according to the present invention, the mole percentage $R_1$ of the content of Mg to the total content of Ce, Zr, Y and Mg ($R_1$=the molar amount of Mg/the total molar amount of Ce, Zr, Y and Mg×100) is preferably 0.5% by mole or more and 15% by mole or less, more preferably 1% by mole or more and 15% by mole or less, still more preferably 1.5% by mole or more and 10% by mole or less, yet still more preferably 2% by mole or more and 7.5% by mole or less, yet still more preferably 3% by mole or more and 7% by mole or less, yet still more preferably 4% by mole or more and 7% by mole or less, and yet still more preferably 5% by mole or more and 7% by mole or less, from the viewpoint of further improving the oxygen storage capacity of the pyrochlore-type $CeO_2$—$ZrO_2$-based complex oxide according to the present invention.

In the pyrochlore-type $CeO_2$—$ZrO_2$-based complex oxide according to the present invention, the mole percentage $R_2$ of the total content of Y and Mg to the total content of Ce, Zr, Y and Mg ($R_2$=the total molar amount of Y and Mg/the total molar amount of Ce, Zr, Y and Mg×100) is preferably 5.5% by mole or more and 20% by mole or less, more preferably 6% by mole or more and 20% by mole or less, still more preferably 6.5% by mole or more and 15% by mole or less, yet still more preferably 7% by mole or more and 12.5% by mole or less, yet still more preferably 8% by mole or more and 12% by mole or less, yet still more preferably 9% by mole or more and 12% by mole or less, and yet still more preferably 10% by mole or more and 12% by mole or less, from the viewpoint of further improving the oxygen storage capacity of the pyrochlore-type $CeO_2$—$ZrO_2$-based complex oxide according to the present invention.

In the pyrochlore-type $CeO_2$—$ZrO_2$-based complex oxide according to the present invention, the mole ratio $R_3$ of the content of Mg to the content of Y ($R_3$=the molar amount of Mg/the molar amount of Y) is preferably 0.1 or more and 2.6 or less, more preferably 0.3 or more and 2.3 or less, still more preferably 0.5 or more and 2.3 or less, yet still more preferably 1.0 or more and 2.3 or less, yet still more preferably more than 1.0 and 2.0 or less, and yet still more preferably 1.1 or more and 1.5 or less, from the viewpoint of further improving the oxygen storage capacity of the pyrochlore-type $CeO_2$—$ZrO_2$-based complex oxide according to the present invention.

In the pyrochlore-type $CeO_2$—$ZrO_2$-based complex oxide according to the present invention, the mole ratio $R_4$ of the content of Mg to the content of Ce ($R_4$=the molar amount of Mg/the molar amount of Ce) is preferably 0.01 or more and 0.3 or less, more preferably 0.02 or more and 0.3 or less, still more preferably 0.03 or more and 0.25 or less, yet still more preferably 0.04 or more and 0.25 or less, yet still more preferably 0.05 or more and 0.2 or less, and yet still more preferably 0.06 or more and 0.15 or less, from the viewpoint of further improving the oxygen storage capacity of the pyrochlore-type $CeO_2$—$ZrO_2$-based complex oxide according to the present invention.

In the pyrochlore-type $CeO_2$—$ZrO_2$-based complex oxide according to the present invention, the mole ratio $R_5$ of the content of Zr to the content of Ce ($R_5$=the molar amount of Zr/the molar amount of Ce) is preferably 0.85 or more and 1.15 or less, more preferably 0.90 or more and 1.10 or less, and still more preferably 0.95 or more and 1.05 or less, from the viewpoint of further improving the oxygen storage capacity of the pyrochlore-type $CeO_2$—$ZrO_2$-based complex oxide according to the present invention.

Two or three or more of $R_0$ to $R_5$ as described above are preferably combined, from the viewpoint of further improving the oxygen storage capacity (particularly, the oxygen storage capacity after being exposed to a high temperature environment).

In one embodiment, the pyrochlore-type $CeO_2$—$ZrO_2$-based complex oxide according to the present invention is composed of: an oxygen element; four kinds of metal elements, namely, Ce, Zr, Y and Mg; and optionally unavoidable impurities.

In another embodiment, the pyrochlore-type $CeO_2$—$ZrO_2$-based complex oxide according to the present invention is composed of: an oxygen element; four kinds of metal elements, namely, Ce, Zr, Y and Mg; one or more metal elements other than Ce, Zr, Y and Mg; and optionally unavoidable impurities.

Examples of the unavoidable impurities include trace elements contained in a production raw material of the pyrochlore-type $CeO_2$—$ZrO_2$-based complex oxide according to the present invention (for example, a trace amount of hafnium contained in a material used as a zirconium source, etc.).

The content of the unavoidable impurities is preferably 0.6% by mole or less, more preferably 0.3% by mole or less, and still more preferably 0.1% by mole or less, based on the total content of all the elements contained in the pyrochlore-type $CeO_2$—$ZrO_2$-based complex oxide according to the present invention.

The one or more metal elements other than Ce, Zr, Y and Mg can be selected, for example, from rare earth elements other than Ce and Y, alkaline earth metal elements and transition metal elements, but are preferably selected from rare earth elements other than Ce and Y.

Examples of the rare earth element other than Ce and Y include Pr (praseodymium element), Sc (scandium element), La (lanthanum element), Nd (neodymium element), Sm (samarium element), Eu (europium element), Gd (gadolinium element), Tb (terbium element), Dy (dysprosium), Ho (holmium element), Er (erbium element), Tm (thulium element), Yb (ytterbium element) and Lu (lutetium element). Among these, Pr, La, Nd and the like are preferred. Oxides of rare earth elements are sesqui oxides ($Re_2O_3$, Re represents a rare earth element), excluding those of Pr and Tb. The oxide of Pr is usually $Pr_6O_{11}$, and the oxide of Tb is usually $Tb_4O_7$. The rare earth element or an oxide thereof may form a solid solution phase along with $CeO_2$ and/or $ZrO_2$, or may form a single phase which is a crystal phase or an amorphous phase.

Examples of the alkaline earth metal element include Ca (calcium element), Sr (strontium element), Ba (barium element) and Ra (radium element). Among these, Ca, Sr, Ba and the like are preferred. The alkaline earth metal element or an oxide thereof may form a solid solution phase along with $CeO_2$ and/or $ZrO_2$, or may form a single phase which is a crystal phase or an amorphous phase.

Examples of the transition metal element include Mn (manganese element), Fe (iron element), Co (cobalt element), Ni (nickel element) and Cu (copper element). The transition metal element or an oxide thereof may form a solid solution phase along with $CeO_2$ and/or $ZrO_2$, or may form a single phase which is a crystal phase or an amorphous phase.

The total content of the one or more metal elements other than Ce, Zr, Y and Mg is preferably 0.5% by mole or more and 15% by mole or less, more preferably 1.5% by mole or more and 10% by mole or less, and still more preferably 3% by mole or more and 7% by mole or less, based on the total content of all the metal elements contained in the pyrochlore-type $CeO_2$—$ZrO_2$-based complex oxide according to the present invention.

The amounts of elements contained in the pyrochlore-type $CeO_2$—$ZrO_2$-based complex oxide according to the present invention can be measured by a conventional method, such as inductively coupled plasma atomic emission spectrophotometry (ICP-AES) or the like, and the ratios ($R_1$ to $R_5$ and the like) of the amounts of elements can be calculated from the measured amounts of elements.

The pyrochlore-type $CeO_2$—$ZrO_2$-based complex oxide according to the present invention is usually used in the form of a powder, as a constituent material of an exhaust gas purification catalyst composition or an exhaust gas purification catalyst. The powder can be produced by crushing the pyrochlore-type $CeO_2$—$ZrO_2$-based complex oxide. The crushing can be carried out in accordance with a conventional method. The crushing can be carried out by a dry process or a wet process, using, for example, a mortar, a hammer mill, a ball mill, a bead mill, a jet mill, a roller mill or the like.

<Method of Producing Pyrochlore-Type $CeO_2$—$ZrO_2$-Based Complex Oxide>

The pyrochlore-type $CeO_2$—$ZrO_2$-based complex oxide according to the present invention can be produced by a first method including the following steps of:

(A1) preparing a starting material containing a cerium raw material, a zirconium raw material, an yttrium raw material, a magnesium raw material, and optionally one or more other metal element raw materials;

(A2) melting the starting material prepared in the step (A1) to obtain a molten product;

(A3) slowly cooling the molten product obtained in the step (A2) to form an ingot;

(A4) crushing the ingot obtained in the step (A3) to obtain a powder; and (A5) heating the powder obtained in the step (A4) at a temperature of from 700 to 1,100° C.

The first method can be carried out in accordance with the method described in JP 2015-182932 A. Therefore, the conditions described in JP 2015-182932 A can be employed, for the conditions that are not mentioned in the present specification.

<Step (A1)>

The step (A1) is the step of preparing a starting material containing a cerium raw material, a zirconium raw material, an yttrium raw material, a magnesium raw material, and optionally one or more other metal element raw materials.

The cerium raw material is a supply source for a cerium element. Examples of the cerium raw material include cerium oxide. Cerium oxide can be synthesized, for example, from nitrate, carbonate, sulfate, acetate, chloride, bromide or the like, of cerium. The cerium raw material may contain nitrate, carbonate, sulfate, chloride, bromide or the like, of cerium. The cerium raw material is preferably in the form of a powder.

The zirconium raw material is a supply source for a zirconium element. Examples of the zirconium raw material include zirconium oxide. Zirconium oxide can be synthesized, for example, from nitrate, carbonate, sulfate, acetate, chloride, bromide or the like, of zirconium. The zirconium raw material may contain nitrate, carbonate, sulfate, chloride, bromide or the like, of zirconium. The zirconium raw material is preferably in the form of a powder.

The yttrium raw material is a supply source for an yttrium element. Examples of the yttrium raw material include yttrium oxide. Yttrium oxide can be synthesized, for example, from nitrate, carbonate, sulfate, acetate, chloride, bromide or the like, of yttrium. The yttrium raw material may contain nitrate, carbonate, sulfate, chloride, bromide or the like, of yttrium. The yttrium raw material is preferably in the form of a powder.

The magnesium raw material is a supply source for a magnesium element. Examples of the magnesium raw material include magnesium oxide. Magnesium oxide can be synthesized, for example, from nitrate, carbonate, sulfate, acetate, chloride, bromide or the like, of magnesium. The magnesium raw material may contain nitrate, carbonate, sulfate, chloride, bromide or the like, of magnesium. The magnesium raw material is preferably in the form of a powder.

The other metal element raw material is a supply source for a metal element other than Ce, Zr, Y and Mg (for example, a rare earth element other than Ce and Y, an alkaline earth metal element or a transition element). Examples of the other metal element raw material include an oxide of a metal element other than Ce, Zr, Y and Mg. The oxide of a metal element other than Ce, Zr, Y and Mg can be synthesized, for example, from a nitrate, a carbonate, a sulfate, an acetate, a chloride, a bromide or the like, of a metal element other than Ce, Zr, Y and Mg. The other metal element material may contain a nitrate, a carbonate, a sulfate, a chloride, a bromide or the like, of a metal element other than Ce, Zr, Y and Mg. The other metal element raw material is preferably in the form of a powder.

Each of the cerium raw material, the zirconium raw material, the yttrium raw material, the magnesium raw material and the one or more other metal element raw materials preferably has a purity of 99.9% or more, but not particularly limited thereto.

The starting material can be obtained by mixing the cerium raw material, the zirconium raw material, the yttrium raw material, the magnesium raw material, and optionally the one or more other metal element raw materials. The starting material is preferably in the form of a powder.

<Step (A2)>

The step (A2) is the step of melting the starting material prepared in the step (A1) to obtain a molten product.

The molten product can be obtained by heating and melting the starting material. The heating of the starting material needs to be carried out such that at least a part of the starting material (namely, at least one of the cerium raw material, the zirconium raw material, the yttrium raw material, the magnesium raw material, and the one or more other metal element raw materials which are optionally contained) is melted. However, the heating is preferably carried out such that the entirety of the starting material is melted. To allow the entirety of the starting material to melt, the starting material needs to be heated at a temperature equal or higher than the melting point of a compound having the highest melting point, of all the compounds contained in the starting material. By heating the starting material until it turns into a molten state in the step (A2), it is possible to obtain a pyrochlore-type $CeO_2$—$ZrO_2$-based complex oxide as a solid solution, in the step (A5).

The melting of the starting material can be carried out, for example, using a melting apparatus or the like. Examples of the method of melting the starting material include melting methods such as an arc method and a high-frequency thermal plasma method. Among these, a common electric melting method, namely, a melting method using an arc electric furnace is preferably employed.

The melting of the starting material can be carried out, for example, by heating the starting material with an electrical energy of from 600 to 800 kWh/kg, in terms of electric power consumption rate, and then heating with an electrical energy of from 800 to 1,000 kWh/kg, in terms of electric power consumption rate. The first-stage heating allows the most of the starting material to melt, and the second-stage heating allows the entirety of the starting material to melt completely, which makes it possible to obtain a homogeneous molten product, namely, a molten product in which various types of raw materials are mixed homogeneously.

The electrical energy to be applied in the first-stage heating is preferably from 625 to 775 kWh/kg, and more preferably from 650 to 750 kWh/kg, in terms of electric power consumption rate. The first-stage heating is preferably carried out for a heating time of from 1 to 3 hours. The electrical energy to be applied in the second-stage heating is preferably from 825 to 975 kWh/kg, and more preferably 850 to 950 kWh/kg, in terms of electric power consumption rate. The second-stage heating is preferably carried out for a heating time of from 6 to 10 hours, and more preferably from 6 to 8 hours.

In the case of using the melting method using an arc electric furnace, a specified amount of an electrically conductive material (such as coke) for inducing the initial energization may be added to the starting material, before heating the starting material. The amount of coke to be added can be adjusted as appropriate, depending on the composition of the starting material.

The melting of the starting material is carried out, for example, in an atmosphere such as an air atmosphere, a nitrogen atmosphere, or an atmosphere of an inert gas such as argon gas, helium gas or the like. The starting material may be melted at the atmospheric pressure, or under a pressurized or reduced pressure, but usually melted at the atmospheric pressure.

<Step (A3)>

The step (A3) is the step of slowly cooling the molten product obtained in the step (A2) to form an ingot.

The ingot can be formed in accordance with a conventional method. In the case of melting the starting material in an electric furnace, for example, the ingot can be formed by attaching a carbon lid to the electric furnace, and performing slow cooling over 20 to 60 hours. The slow cooling time is preferably from 30 to 50 hours, more preferably from 35 to 45 hours, and still more preferably from 35 to 40 hours. The slow cooling of the molten product can be carried out, for example, by leaving the molten product to cool in an air atmosphere such that the temperature thereof reaches 100° C. or lower, and preferably 50° C. or lower. When there is a risk that the temperature of the molten product drops rapidly to result in a slow cooling time of shorter than 20 to 60 hours, it is preferred to heat the molten product as appropriate during the slow cooling step, to avoid a rapid drop in the temperature of the molten product. By performing the slow cooling while avoiding a rapid drop in the temperature of the molten product, the elements contained in the molten product can more easily form a homogeneous solid solution with one another.

<Step (A4)>

The step (A4) is the step of crushing the ingot obtained in the step (A3) to obtain a powder.

The crushing of the ingot can be carried out in accordance with a conventional method. The ingot can be crushed, for example, using a crusher, such as a jaw crusher or a roll crusher. The powder obtained by crushing the ingot preferably has an average particle size of 3 mm or less, and more preferably 1 mm or less. The powder may be classified after the crushing. For example, it is possible to collect a powder having a desired average particle size, by performing classification using a sieve or the like. The average particle size is calculated as the particle size ($D_{50}$) at which the cumulative volume reaches 50% by volume, for example, in a volume-based particle size distribution as measured by a laser diffraction/scattering-type particle size distribution measurement method.

<Step (A5)>

The step (A5) is the step of heating the powder obtained in the step (A4) at a temperature of from 700 to 1,100° C.

Before heating the powder, it is preferred that the powder be subjected to magnetic separation to separate impurities. The powder can be heated, for example, using an electric furnace or the like. The powder is calcined by heating, and suboxides produced in the melting step and the strain within the crystals generated due to excessive cooling can be removed. The heating temperature is preferably from 700° C. to 1,000° C., and more preferably from 600° C. to 900° C. The heating time is preferably from 1 to 5 hours, and more preferably from 2 to 3 hours. The heating may be performed in an air atmosphere, or in an oxygen atmosphere.

The step (A5) enables to obtain a pyrochlore-type $CeO_2$—$ZrO_2$-based complex oxide containing Y and Mg. By heating the starting material until it turns into a molten state in the step (A2), it is possible to obtain a pyrochlore-type $CeO_2$—$ZrO_2$-based complex oxide containing Y and Mg, as a solid solution, in the step (A5).

After the step (A5), the resulting pyrochlore-type $CeO_2$—$ZrO_2$-based complex oxide may be crushed. The crushing can be carried out, for example, using a crusher such as a planetary mill, a ball mill, a jet mill or the like. The crushing by the crusher is carried out, for example, for a period of from about 5 to 30 minutes. The powder after crushing preferably has an average particle size of from 0.3 to 2.0 μm, and more preferably from 0.5 to 1.5 μm. The average particle size is calculated as the particle size ($D_{50}$) at which the cumulative volume reaches 50% by volume, for example, in a volume-based particle size distribution as measured by a laser diffraction/scattering-type particle size distribution measurement method.

Further, the pyrochlore-type $CeO_2$—$ZrO_2$-based complex oxide according to the present invention can be produced by a second method including the following steps of:

(B1) preparing a starting material containing a cerium raw material, a zirconium raw material, an yttrium raw material, and optionally one or more other metal element raw materials;

(B2) melting the starting material prepared in the step (B1) to obtain a molten product;

(B3) slowly cooling the molten product obtained in the step (B2) to form an ingot;

(B4) crushing the ingot obtained in the step (B3) to obtain a powder;

(B5) heating the powder obtained in the step (B4) at a temperature of from 700 to 1,100° C.; and (B6) mixing a calcined product obtained in the step (B5) and an aqueous solution containing a magnesium salt, followed by drying and calcination.

The second method can be carried out in accordance with the method described in JP 2015-182932 A. Therefore, the conditions described in JP 2015-182932 A can be employed, for the conditions that are not mentioned in the present specification.

The starting material prepared in the step (B1) is the same as the starting material prepared in the step (A1), except that the magnesium raw material is not included, and the step (B1) can be carried out in the same manner as the step (A1).

The steps (B2), (B3), (B4) and (B5) can be carried out in the same manner as the steps (A2), (A3), (A4) and (A5), respectively.

The step (B5) enables to obtain a pyrochlore-type $CeO_2$—$ZrO_2$-based complex oxide which contains Y but does not contain Mg. By heating the starting material until it turns into a molten state in the step (B2), it is possible to obtain a pyrochlore-type $CeO_2$—$ZrO_2$-based complex oxide which contains Y but does not contain Mg, as a solid solution, in the step (B5).

After the step (B5), the resulting pyrochlore-type $CeO_2$—$ZrO_2$-based complex oxide may be crushed. The crushing can be carried out, for example, using a crusher such as a planetary mill, a ball mill, a jet mill or the like. The crushing by the crusher is carried out, for example, for a period of from about 5 to 30 minutes. The powder after crushing preferably has an average particle size of from 0.3 to 2.0 μm, and more preferably from 0.5 to 1.5 μm. The average particle size is calculated as the particle size ($D_{50}$) at which the cumulative volume reaches 50% by volume, for example, in a volume-based particle size distribution as measured by a laser diffraction/scattering-type particle size distribution measurement method.

The step (B6) is the step of mixing a calcined product obtained in the step (B5) and an aqueous solution containing a magnesium salt, followed by drying and calcination. The step (B6) enables to obtain a pyrochlore-type $CeO_2$—$ZrO_2$-based complex oxide containing Y and Mg.

The magnesium salt is preferably a water-soluble salt, and examples thereof include magnesium nitrate, magnesium chloride and magnesium sulfate.

The concentration of the magnesium salt contained in the aqueous solution can be adjusted as appropriate, depending on the composition of the pyrochlore-type $CeO_2$—$ZrO_2$-based complex oxide according to the present invention.

The aqueous solution contains water (such as ion exchanged water) as a solvent. The aqueous solution may contain one or more solvents other than water. Examples of the solvent other than water include organic solvents such as alcohols, acetone, dimethyl sulfoxide and dimethylformamide.

By mixing the pyrochlore-type $CeO_2$—$ZrO_2$-based complex oxide which contains Y but does not contain Mg, and an aqueous solution containing a magnesium salt, the pyrochlore-type $CeO_2$—$ZrO_2$-based complex oxide is impregnated with the aqueous solution containing a magnesium salt. The drying and calcination of the mixture can be carried out in accordance with a conventional method. The drying temperature is usually 90° C. or higher and 150° C. or lower, and preferably 100° C. or higher and 120° C. or lower; and the drying time is usually 6 hours or more and 48 hours or less, and preferably 12 hours or more and 24 hours or less. The calcination temperature is usually 500° C. or higher and 900° C. or lower, and preferably 600° C. or higher and 800° C. or lower; and the calcination time is usually 1 hour or more and 12 hours or less, and preferably 3 hours or more and 6 hours or less. The atmosphere during the calcination is preferably an air atmosphere.

As described above, since Mg is thought to contribute mainly to an improvement in the dispersibility of a noble metal element at the time of allowing the noble metal element to be supported on the pyrochlore-type $CeO_2$—$ZrO_2$-based complex oxide, Mg is preferably present in the surface layer of the pyrochlore-type $CeO_2$—$ZrO_2$-based complex oxide according to the present invention, in a highly dispersed state. When the first method is used, Mg is more likely to be present between the pyrochlore phases, allowing Mg to be present in the surface layer of the pyrochlore-type $CeO_2$—$ZrO_2$-based complex oxide according to the present invention, in a highly dispersed state. Accordingly, it is preferred to use the first method.

<Catalytically-Active Component>

The catalytically-active component may contain one kind of noble metal element, or two or more kinds of noble metal elements. Examples of the noble metal element include Au (gold element), Ag (silver element), Pt (platinum element), Pd (palladium element), Rh (rhodium element), Ir (iridium element), Ru (ruthenium element) and Os (osmium element). Among these, Pt, Pd, Rh and the like are preferred. In one embodiment, the exhaust gas purification catalyst composition according to the present invention contains a noble metal element, in the form of a salt of the noble metal element which is a supply source of the noble metal element. Examples of the salt of the noble metal element include a nitrate, an ammine complex salt, a chloride or the like.

The content of the noble metal element in the exhaust gas purification catalyst composition according to the present invention is preferably 0.01% by mass or more and 20% by mass or less, more preferably 0.1% by mass or more and 10% by mass or less, and still more preferably 1% by mass or more and 5% by mass or less, based on the total mass of the pyrochlore-type $CeO_2$—$ZrO_2$-based complex oxide according to the present invention and the noble metal element in the exhaust gas purification catalyst composition according to the present invention. The amount of the noble metal element can be measured by analyzing a powder obtained by drying the exhaust gas purification catalyst composition according to the present invention, by EDS (energy dispersive spectrometer), and using the resulting element mapping.

<Form of Exhaust Gas Purification Catalyst Composition>

The form of the exhaust gas purification catalyst composition according to the present invention is not particularly limited, as long as the catalyst composition contains the pyrochlore-type $CeO_2$—$ZrO_2$-based complex oxide according to the present invention and a noble metal element. In one embodiment, the exhaust gas purification catalyst composition according to the present invention is in the form of a liquid, for example, in the form of a dispersion liquid containing the pyrochlore-type $CeO_2$—$ZrO_2$-based complex oxide according to the present invention and a salt of a noble metal element. In this embodiment, the salt of the noble metal element (including noble metal ions produced by electrolytic dissociation of the salt of the noble metal element) is preferably impregnated into the pyrochlore-type $CeO_2$—$ZrO_2$-based complex oxide according to the present invention.

The dispersion liquid has any of various viscosities depending on the content of the pyrochlore-type $CeO_2$—$ZrO_2$-based complex oxide according to the present invention, and takes any of various forms, such as an ink, a slurry or a paste, depending on the viscosity. The dispersion liquid is preferably in the form of a slurry. When the dispersion liquid is a slurry, the content of the pyrochlore-type $CeO_2$—$ZrO_2$-based complex oxide according to the present invention in the dispersion liquid is preferably 0.1% by mass or more and 30% by mass or less, more preferably 1% by mass or more and 20% by mass or less, and still more preferably 5% by mass or more and 15% by mass or less, based on the total mass of the dispersion liquid.

Examples of the dispersion medium to be contained in the dispersion liquid include water and organic solvents. The dispersion medium may be one kind of solvent, or may be a mixture of two or more kinds of solvents. The mixture of two or more kinds of solvents may be, for example, a mixture of water and one or more organic solvents, a mixture of two or more kinds organic solvents, or the like. Examples of the organic solvent include alcohols, acetone, dimethyl sulfoxide and dimethylformamide.

<Other Components>

The exhaust gas purification catalyst composition according to the present invention may contain a $CeO_2$—$ZrO_2$-based complex oxide other than the pyrochlore-type $CeO_2$—$ZrO_2$-based complex oxide according to the present invention (hereinafter, referred to as "other $CeO_2$—$ZrO_2$-based complex oxide"). The other $CeO_2$—$ZrO_2$-based complex oxide is usually in the form of a powder. The other $CeO_2$—$ZrO_2$-based complex oxide may be a pyrochlore-type $CeO_2$—$ZrO_2$-based complex oxide, or a fluorite-type $CeO_2$—$ZrO_2$-based complex oxide. However, the other $CeO_2$—$ZrO_2$-based complex oxide is preferably a fluorite-type $CeO_2$—$ZrO_2$-based complex oxide. The fluorite-type $CeO_2$—$ZrO_2$-based complex oxide contains a fluorite phase. A typical composition of the fluorite phase is $Ce_xZr_{1-x}O_2$ (wherein 0<X<1). The fluorite-type $CeO_2$—$ZrO_2$-based complex oxide may be composed of a single phase of the fluorite phase, or may be composed of a mixed phase of the fluorite phase and one or more other phases. The other phase may be a crystal phase or an amorphous phase. In the case where the fluorite-type $CeO_2$—$ZrO_2$-based complex oxide is composed of a mixed phase, it is preferred that the fluorite phase constitutes the main phase. The term "main phase" refers to a crystal phase from which the peak having the maximum intensity (namely, the main peak) is derived, in a diffraction pattern of the $CeO_2$—$ZrO_2$-based complex oxide obtained by a powder X-ray diffraction method (XRD) using CuKα.

When the exhaust gas purification catalyst composition according to the present invention contains the fluorite-type $CeO_2$—$ZrO_2$-based complex oxide in addition to the pyrochlore-type $CeO_2$—$ZrO_2$-based complex oxide according to the present invention, the mass ratio of the content of the fluorite-type $CeO_2$—$ZrO_2$-based complex oxide and the content of the pyrochlore-type $CeO_2$—$ZrO_2$-based complex oxide according to the present invention (the mass of the fluorite-type $CeO_2$—$ZrO_2$-based complex oxide: the mass of the pyrochlore-type $CeO_2$—$ZrO_2$-based complex oxide according to the present invention) is preferably from 1:99 to 99:1, more preferably from 10:90 to 90:10, and still more preferably from 30:70 to 70:30.

The exhaust gas purification catalyst composition according to the present invention may contain a carrier component. The carrier component is preferably a porous material. Examples of the carrier component include: oxides ($Re_2O_3$) of rare earth metals, such as $Al_2O_3$, $ZrO_2$, $SiO_2$, $TiO_2$ and $La_2O_3$; zeolite (aluminosilicate); and oxides based on MgO, ZnO, $SnO_2$ and the like. Examples of a preferred carrier component include alumina, silica, silica-alumina, aluminosilicates, alumina-zirconia, alumina-chromia, alumina-ceria and alumina-lantana.

The exhaust gas purification catalyst composition according to the present invention may contain a stabilizer. Examples of the stabilizer include an alkaline earth metal compound and the like. Examples of the alkaline earth metal element include Sr (strontium element) and Ba (barium element). In the case where the noble metal element contained in the exhaust gas purification catalyst composition is Pd, Ba is preferred, because Ba allows the temperature at which $PdO_x$ is reduced to be the highest, namely, Ba makes $PdO_x$ less easily reduced. Examples of the alkaline earth metal compound include nitrates, carbonates, oxides, sulfates and the like, of alkaline earth metal elements.

The exhaust gas purification catalyst composition according to the present invention may contain a binder component. Examples of the binder component include an inorganic-based binder, such as alumina sol.

The exhaust gas purification catalyst composition according to the present invention can be used as a material for producing an exhaust gas purification catalyst which contains the pyrochlore-type $CeO_2$—$ZrO_2$-based complex oxide according to the present invention, and a noble metal element supported on the pyrochlore-type $CeO_2$—$ZrO_2$-based complex oxide according to the present invention.

<<Exhaust Gas Purification Catalyst>>

The exhaust gas purification catalyst according to the present invention contains the pyrochlore-type $CeO_2$—$ZrO_2$-based complex oxide according to the present invention, and a catalytically-active component supported on the pyrochlore-type $CeO_2$—$ZrO_2$-based complex oxide.

The catalytically-active component may contain one kind of noble metal element, or two or more kinds of noble metal elements. Examples of the noble metal element include Au (gold element), Ag (silver element), Pt (platinum element), Pd (palladium element), Rh (rhodium element), Ir (iridium element), Ru (ruthenium element) and Os (osmium element). Among these, Pt, Pd, Rh and the like are preferred. In one embodiment, the exhaust gas purification catalyst according to the present invention contains a noble metal element in a form capable of functioning as a catalytically-active component, for example, in the form of a noble metal, an alloy containing the noble metal element, a compound containing the noble metal element (such as an oxide of the noble metal element), or the like. The catalytically-active component is preferably in the form of particles, from the viewpoint of enhancing the exhaust gas purification performance.

The content of the noble metal element in the exhaust gas purification catalyst according to the present invention is preferably 0.01% by mass or more and 20% by mass or less, more preferably 0.1% by mass or more and 10% by mass or less, and still more preferably 1% by mass or more and 5% by mass or less, based on the total mass of the pyrochlore-type $CeO_2$—$ZrO_2$-based complex oxide according to the present invention and the noble metal element. The amount of the noble metal element can be measured by analyzing a cross section of the exhaust gas purification catalyst according to the present invention, by EDS (energy dispersive spectrometer), and using the resulting element mapping. It is noted that the mass of the noble metal element is the mass in terms of metal.

The term "supported" refers to a state in which a noble metal element is physically or chemically absorbed or retained on the outer surface, or on the inner surface of the pores, of the pyrochlore-type $CeO_2$—$ZrO_2$-based complex oxide according to the present invention. The fact that a noble metal element is supported on the pyrochlore-type $CeO_2$—$ZrO_2$-based complex oxide according to the present invention can be confirmed, for example, by the presence of the pyrochlore-type $CeO_2$—$ZrO_2$-based complex oxide according to the present invention and the noble metal element in the same region in an element mapping obtained by analyzing a cross section of the exhaust gas purification catalyst according to the present invention by EDS (energy dispersive spectrometer).

The average particle size of a certain particle (for example, a catalytically-active component) supported on another particle (for example, a particle of the pyrochlore-type $CeO_2$—$ZrO_2$-based complex oxide according to the present invention) is preferably 10% or less, more preferably 3% or less, and still more preferably 1% or less, with respect to the average particle size of the other particle. The term "average particle size" as used herein refers to the mean value of the Feret's diameters of 30 or more particles, when observed by SEM.

The exhaust gas purification catalyst according to the present invention may contain components other than the pyrochlore-type $CeO_2$—$ZrO_2$-based complex oxide according to the present invention and a noble metal element (hereinafter, referred to as "other components"). The other components are the same as those mentioned for the exhaust gas purification catalyst composition according to the present invention, and examples thereof include a $CeO_2$—$ZrO_2$-based complex oxide other than the pyrochlore-type $CeO_2$—$ZrO_2$-based complex oxide according to the present invention (such as a fluorite-type $CeO_2$—$ZrO_2$-based complex oxide), a carrier component, a stabilizer, a binder component and the like. The descriptions of the other components are the same as described above, and thus are omitted.

In one embodiment, the exhaust gas purification catalyst according to the present invention is a compact in the form of pellets or the like. The exhaust gas purification catalyst according to this embodiment can be produced, for example, by mixing the pyrochlore-type $CeO_2$—$ZrO_2$-based complex oxide according to the present invention and an aqueous solution containing a noble metal salt, followed by drying and calcination. The mixing allows the pyrochlore-type $CeO_2$—$ZrO_2$-based complex oxide according to the present invention to be impregnated with the aqueous solution containing a noble metal salt. Examples of the noble metal salt include a nitrate, an ammine complex salt, a chloride or the like. The aqueous solution contains water (such as ion exchanged water) as a solvent. The aqueous solution may contain one or more solvents other than water. Examples of the solvent other than water include organic solvents such as alcohols, acetone, dimethyl sulfoxide and dimethylformamide. The drying temperature is usually 90° C. or higher and 150° C. or lower, and preferably 100° C. or higher and 120° C. or lower; and the drying time is usually 6 hours or more and 48 hours or less, and preferably 12 hours or more and 24 hours or less. The calcination temperature is usually 500° C. or higher and 900° C. or lower, and preferably 600° C. or higher and 800° C. or lower; and the calcination time is usually 1 hour or more and 12 hours or less, and preferably 3 hours or more and 6 hours or less. The atmosphere during the calcination is preferably an air atmosphere.

In another embodiment, the exhaust gas purification catalyst according to the present invention includes a substrate, and a catalyst layer formed on the substrate, wherein the catalyst layer contains the pyrochlore-type $CeO_2$—$ZrO_2$-based complex oxide according to the present invention, and a noble metal element supported on the pyrochlore-type $CeO_2$—$ZrO_2$-based complex oxide.

The substrate can be selected as appropriate from substrates used in known exhaust gas purification catalysts. Examples of the material of the substrate include: ceramics such as alumina ($Al_2O_3$), mullite ($3Al_2O_3 \cdot 2SiO_2$), cordierite ($2MgO \cdot 2Al_2O_3 \cdot 5SiO_2$), aluminum titanate ($Al_2TiO_5$) and silicon carbide (SIC); and metallic materials such as stainless steel. The substrate may be, for example, in the form of a honeycomb, pellets or spheres. In the case of using a substrate in the form of a honeycomb, for example, it is possible to use a monolithic substrate having a number of parallel, fine gas flow paths, namely, channels, in the interior of the substrate, such that a fluid passes through the interior of the substrate.

The catalyst layer can be formed by coating the exhaust gas purification catalyst composition according to the present invention on the surface of the substrate by wash coating, followed by drying and calcination. In the case of using a monolithic substrate, for example, it is possible to form a catalyst layer on the surface of the inner wall of each channel in the monolithic substrate, by coating the exhaust gas purification catalyst composition according to the present invention on the surface of the inner wall of each channel in the monolithic substrate by wash coating, followed by drying and calcination. The thickness of the catalyst layer can be adjusted by adjusting the amount to be wash-coated. The drying temperature is usually 60° C. or higher and 150° C. or lower, and preferably 90° C. or higher and 120° C. or lower; and the drying time is usually 0.1 hours or more and 2 hours or less, and preferably 0.2 hours or more and 1 hour or less. The calcination temperature is usually 400° C. or higher and 900° C. or lower, and preferably 600° C. or higher and 800° C. or lower; and the calcination time is usually 1 hour or more and 12 hours or less, and preferably 3 hours or more and 6 hours or less. The atmosphere during the calcination is preferably an air atmosphere.

EXAMPLES

The present invention will now be described in further detail, by way of Examples and Comparative Examples. Hereinafter, the pyrochlore-type $CeO_2$—$ZrO_2$-based complex oxide is referred to as "pyrochlore CZ".

Example 1

(1) Production of Pyrochlore CZ Powder Containing Y

A cerium oxide powder (purity: 99.9%, manufactured by Mitsuwa Chemicals Co., Ltd.), a zirconium oxide powder (purity: 99.9%, manufactured by Daiichi Kigenso Kagaku Kogyo Co., Ltd.) and an yttrium oxide powder (purity: 99.9%, manufactured by Wako Pure Chemical Industries, Ltd.) were mixed, to obtain a starting material. At this time, the amounts of Ce, Zr and Y in the starting material were adjusted to 47.8% by mole, 47.1% by mole and 5.1% by mole, respectively, based on the total molar amount of Ce, Zr and Y. Subsequently, the starting material was allowed to melt. Specifically, using an arc electric furnace, the starting material was first heated with an electrical energy of 650 kWh/kg, in terms of electric power consumption rate, over 2 hours, and then with an electrical energy of 900 kWh/kg, in terms of electric power consumption rate, over 6 hours, to carry out melting at a temperature of 2,200° C. or higher. The entirety of the starting material was allowed to melt by this step. In this melting step, 500 g of coke was used in order to induce the initial energization.

After the completion of the melting described above, a carbon lid was attached to the electric furnace, and the molten product was slowly cooled for 24 hours in an air atmosphere, to obtain an ingot. The thus obtained ingot was crushed to a size of 3 mm or less with a jaw crusher and a roll crusher, and then a powder of 1 mm or less was collected using a sieve. Subsequently, the resulting powder was heat-treated in an air atmosphere, in an 800° C.-atmosphere over 3 hours, using an electric furnace, to perform the removal of suboxides produced in the previous melting step, or the removal of the strain within the crystals generated due to excessive cooling. Thereafter, the product obtained by the heat treatment was subjected to a crushing treatment with a planetary mill over 10 minutes, to obtain a pyrochlore CZ powder containing Y. The amounts of Ce, Zr and Y in the pyrochlore CZ powder containing Y are 47.8% by mole, 47.1% by mole and 5.1% by mole, respectively, based on the total molar amount of the Ce, Zr and Y.

(2) Production of Pyrochlore CZ Powder Containing Y and Mg

Mg was supported on the pyrochlore CZ powder containing Y produced in the section (1), to produce a pyrochlore CZ powder containing Y and Mg. Specifically, the pyrochlore CZ powder containing Y and an aqueous solution of magnesium nitrate were mixed so that the pyrochlore CZ powder containing Y was impregnated with the aqueous solution of magnesium nitrate, and then the resultant was dried, and calcined in an air atmosphere at 600° C. for 3 hours. Subsequently, the resulting calcined product was crushed, to obtain a pyrochlore CZ powder containing Y and Mg. The amount of pyrochlore CZ powder containing Y as well as the concentration and the amount of the aqueous solution of magnesium nitrate were adjusted, so that the amounts of Ce, Zr, Y and Mg contained in the pyrochlore CZ powder were adjusted to 47.4% by mole, 46.6% by mole, 5.1% by mole and 0.9% by mole, respectively, based on the total molar amount of Ce, Zr, Y and Mg. The composition of the pyrochlore CZ powder produced in the section (2) is shown in Table 1.

(3) Production of Pd-Supported Pyrochlore CZ Powder

Pd was supported on the pyrochlore CZ powder produced in the section (2), to produce a Pd-supported pyrochlore CZ powder. Specifically, the pyrochlore CZ powder produced in the section (2) and an aqueous solution of palladium nitrate (II) were mixed so that the pyrochlore CZ powder is impregnated with the aqueous solution of palladium nitrate. Thereafter, the resultant was dried, and calcined in an air atmosphere at 500° C. for 5 hours, to obtain the Pd-supported pyrochlore CZ powder of Example 1. The amount of Pd supported was adjusted to 1% by mass, based on the total mass of the pyrochlore CZ powder produced in the section (2), and Pd.

Example 2

A pyrochlore CZ powder and a Pd-supported pyrochlore CZ powder were produced in the same manner as in the sections (1) to (3) in Example 1, except that, in the section (2) in Example 1, the amounts of Ce, Zr, Y and Mg contained in the pyrochlore CZ powder were changed to 47.0% by mole, 46.3% by mole, 5.0% by mole and 1.7% by mole, respectively, based on the total molar amount of Ce, Zr, Y and Mg. The composition of the pyrochlore CZ powder produced in Example 2 is shown in Table 1.

Example 3

A pyrochlore CZ powder and a Pd-supported pyrochlore CZ powder were produced in the same manner as in the sections (1) to (3) in Example 1, except that, in the section (2) in Example 1, the amounts of Ce, Zr, Y and Mg contained in the pyrochlore CZ powder were changed to 46.6% by mole, 45.9% by mole, 5.0% by mole and 2.5% by mole, respectively, based on the total molar amount of Ce, Zr, Y and Mg. The composition of the pyrochlore CZ powder produced in Example 3 is shown in Table 1.

Example 4

A pyrochlore CZ powder and a Pd-supported pyrochlore CZ powder were produced in the same manner as in the sections (1) to (3) in Example 1, except that, in the section (1) in Example 1, the amounts of Ce, Zr and Y in the starting material were changed to 46.7% by mole, 48.0% by mole and 5.3% by mole, respectively, based on the total molar amount of the Ce, Zr and Y, and that, in the section (2) in Example 1, the amounts of Ce, Zr, Y and Mg contained in the pyrochlore CZ powder were changed to 43.8% by mole, 45.0% by mole, 5.0% by mole and 6.2% by mole, respectively, based on the total molar amount of Ce, Zr, Y and Mg. The composition of the pyrochlore CZ powder produced in Example 4 is shown in Table 1.

Example 5

A cerium oxide powder (purity: 99.9%, manufactured by Mitsuwa Chemicals Co., Ltd.), a zirconium oxide powder (purity: 99.9%, manufactured by Daiichi Kigenso Kagaku Kogyo Co., Ltd.), an yttrium oxide powder (purity: 99.9%, manufactured by Wako Pure Chemical Industries, Ltd.) and a magnesium oxide powder (purity: 99.9%, manufactured by Konoshima Chemical Co., Ltd.) were mixed, to obtain a starting material. At this time, the amounts of Ce, Zr, Y and Mg in the starting material were adjusted to 43.8% by mole, 45.0% by mole, 5.0% by mole and 6.2% by mole, respectively, based on the total molar amount of Ce, Zr, Y and Mg. A pyrochlore CZ powder containing Y and Mg was obtained in the same manner as in the section (1) in Example 1, except that the thus obtained starting material was used. It is noted that the step corresponding to the section (2) in Example 1 was not performed in Example 5, since the pyrochlore CZ powder containing Y and Mg was produced directly by the step corresponding to the section (1) in Example 1.

Example 6

A pyrochlore CZ powder and a Pd-supported pyrochlore CZ powder were produced in the same manner as in the sections (1) to (3) in Example 1, except that, in the section (1) in Example 1, the amounts of Ce, Zr and Y in the starting material were changed to 46.7% by mole, 46.5% by mole and 6.8% by mole, respectively, based on the total molar amount of the Ce, Zr and Y, and that, in the section (2) in Example 1, the amounts of Ce, Zr, Y and Mg contained in the pyrochlore CZ powder were changed to 43.8% by mole, 43.7% by mole, 6.4% by mole and 6.0% by mole, respectively, based on the total molar amount of Ce, Zr, Y and Mg. The composition of the pyrochlore CZ powder produced in Example 6 is shown in Table 1.

Example 7

A pyrochlore CZ powder and a Pd-supported pyrochlore CZ powder were produced in the same manner as in the sections (1) to (3) in Example 1, except that, in the section (1) in Example 1, the amounts of Ce, Zr and Y in the starting material were changed to 46.7% by mole, 48.0% by mole and 5.3% by mole, respectively, based on the total molar amount of the Ce, Zr and Y, and that, in the section (2) in Example 1, the amounts of Ce, Zr, Y and Mg contained in the pyrochlore CZ powder were changed to 43.0% by mole, 44.2% by mole, 4.9% by mole and 7.9% by mole, respectively, based on the total molar amount of Ce, Zr, Y and Mg. The composition of the pyrochlore CZ powder produced in Example 7 is shown in Table 1.

Example 8

A pyrochlore CZ powder and a Pd-supported pyrochlore CZ powder were produced in the same manner as in the sections (1) to (3) in Example 1, except that, in the section (2) in Example 1, the amounts of Ce, Zr, Y and Mg contained in the pyrochlore CZ powder were changed to 42.5% by mole, 41.9% by mole, 4.5% by mole and 11.1% by mole, respectively, based on the total molar amount of Ce, Zr, Y and Mg. The composition of the pyrochlore CZ powder produced in Example 8 is shown in Table 1.

Comparative Example 1

A pyrochlore CZ powder which contains Y but does not contain Mg was produced in the same manner as in the section (1) in Example 1, and this powder was used to prepare a Pd-supported pyrochlore CZ powder in the same manner as in the section (3) in Example 1. It is noted that the step corresponding to the section (2) in Example 1 was not performed in Comparative Example 1. The composition of the pyrochlore CZ powder produced in Comparative Example 1 is shown in Table 1.

Comparative Example 2

A cerium oxide powder (purity: 99.9%, manufactured by Mitsuwa Chemicals Co., Ltd.), a zirconium oxide powder (purity: 99.9%, manufactured by Daiichi Kigenso Kagaku Kogyo Co., Ltd.) and a magnesium oxide powder (purity: 99.9%, manufactured by Konoshima Chemical Co., Ltd.) were mixed, to obtain a starting material. At this time, the amounts of Ce, Zr and Mg in the starting material were adjusted to 46.9% by mole, 47.7% by mole and 5.4% by mole, respectively, based on the total molar amount of Ce, Zr and Mg. A pyrochlore CZ powder which contains Mg but does not contain Y was produced in the same manner as in the section (1) in Example 1, except that the thus obtained starting material was used. This powder was used to produce a Pd-supported pyrochlore CZ powder, in the same manner as in the section (3) in Example 1. It is noted that the step corresponding to the section (2) in Example 1 was not performed in Comparative Example 2. The composition of the pyrochlore CZ powder produced in Comparative Example 2 is shown in Table 1.

Comparative Example 3

A pyrochlore CZ powder and a Pd-supported pyrochlore CZ powder were produced in the same manner as in Example 1, except that, in the section (2) in Example 1, an aqueous solution of calcium nitrate was used instead of the aqueous solution of magnesium nitrate, to allow Ca to be supported on the raw material powder, and that, in the section (2) in Example 1, the amounts of Ce, Zr, Y and Ca contained in the pyrochlore CZ powder were adjusted to 44.9% by mole, 44.3% by mole, 4.8% by mole and 6.0% by mole, respectively, based on the total molar amount of Ce, Zr, Y and Ca. The composition of the pyrochlore CZ powder produced in Comparative Example 3 is shown in Table 1.

Test Example 1

(1) Heat Treatment of Pd-Supported Pyrochlore CZ Powder

The Pd-supported pyrochlore CZ powder produced in each of Examples 1 to 8 and Comparative Examples 1 to 3 was heat-treated at 1,000° C. for 25 hours, in an atmosphere in which the ratio A/F (Air/Fuel) was varied within the range of from 13.6 to 14.6 while humidifying with 10% $H_2O$.

(2) Evaluation of OSC Performance of Pd-Supported Pyrochlore CZ Powder after Heat Treatment Using a temperature-programmed reduction apparatus (TPR apparatus) manufactured by Hemmi Slide Rule Co., Ltd., an OSC measurement of each complex oxide powder after the heat treatment was carried out by a CO pulse method. In the OSC measurement, each complex oxide powder was subjected to a pretreatment in which the powder was heated to 800° C. under a He flow and maintained at that temperature for 40 minutes, and then the powder was cooled to 600° C. While maintaining the temperature at 600° C., $O_2$ gas was injected divided in 4 pulses, to perform an oxidation treatment, and then a test gas containing CO was injected divided in 15 pulses. Thereafter, the total amount of OSC per unit mass of the complex oxide powder (μmol/g) at 600° C. was measured from the total amount of CO gas consumed, using an infrared gas concentration measuring apparatus (CGT-7000; manufactured by Shimadzu Corporation). The test gas was prepared by diluting He gas with CO gas by 25% by volume. Based on the total amount of OSC measured, the OSC performance of each Pd-supported pyrochlore CZ powder after the heat treatment was evaluated. Specifically, the relative value when the total amount of OSC in Comparative Example 1 was taken as 1.00 was calculated for each Pd-supported pyrochlore CZ powder, and one having a relative value of less than 1.10 was evaluated as "D", one having a relative value of 1.10 or more and less than 1.20 was evaluated as "C", one having a relative value of 1.20 or more and less than 1.30 was evaluated as "B", and one having a relative value of 1.30 or more was evaluated as "A". The results are shown in Table 1.

Test Example 2

(1) Production of Catalyst Structure

The pyrochlore CZ powder produced in Example 5 or Comparative Example 1, an OSC material which is a commercially available product, alumina, an aqueous solution of palladium nitrate, and an aqueous solution of rhodium nitrate were mixed, and the resulting mixture was subjected to a wet crushing treatment, to obtain a catalyst composition in the form of a slurry. The amount of Pd and the amount of Rh were adjusted to 5.0% by mass and 1.0% by mass, respectively, based on the mass of the solid content of the catalyst composition. A fluorite-type $CeO_2$—$ZrO_2$-based complex oxide powder was used as the OSC material. The mass ratio of the pyrochlore CZ powder and the OSC material which is a commercially available product and the alumina was adjusted to 1:3:2.

The resulting slurry was coated on the surface of a honeycomb catalyst support (diameter: 93 mm, length in the axial direction: 95 mm, number of cells: 900 cpsi, volume: 0.645 L; manufactured by NGK Insulators, Ltd.), and then the excessive amount of slurry was blown off. Subsequently, hot air controlled to 70° C. was directly blown to the slurry-coated surface to dry, and then the coated support was calcined at 450° C. for one hour to remove nitrate radicals, to obtain a catalyst structure including the honeycomb catalyst support, and a catalyst layer formed on the honeycomb catalyst support. The mass of the catalyst layer per unit volume of the honeycomb catalyst support (g/L) was adjusted to 230 g/L.

(2) Measurement of Purification Efficiency for Hydrocarbons (THC) of Catalyst Structure after Heat Treatment The catalyst structure produced in the section (1) was heat-treated at 1,000° C. for 25 hours, in an atmosphere in which the ratio A/F was varied within the range of from 13.6 to 14.6 while humidifying with 10% $H_2O$.

Using the catalyst structure after the heat treatment, the purification efficiency for hydrocarbons (THC) was measured. Specifically, a simulated exhaust gas composed of CO, $CO_2$, $C_3H_8$, $O_2$ and NO, with $N_2$ as the balance, was passed through the catalyst structure after the heat treatment, at an A/F ratio of 14.6±0.2, so as to achieve an SV of 68,000 $h^{-1}$. Thereafter, outlet gas components at 450° C. were measured using MOTOR EXHAUST GAS ANALYZER MEXA 7500, manufactured by HORIBA, Ltd., to determine the purification efficiency for hydrocarbons (THC). The results are shown in Table 1.

As shown in Table 1, when the amount of the noble metal element supported on the pyrochlore CZ powders containing both Y and Mg (Example 1 to 8) was the same as the amount of the noble metal element supported on the pyrochlore CZ powders not containing at least one of Y and Mg (Comparative Examples 1 to 3), the pyrochlore CZ powders containing both Y and Mg exhibited a superior oxygen storage capacity (particularly, a superior oxygen storage capacity after being exposed to a high temperature environment), and achieved a superior THC purification efficiency.

The invention claimed is:

1. A composition, comprising:
   a pyrochlore-type $CeO_2$—$ZrO_2$-based complex oxide comprising Y and Mg; and
   a catalytically-active component comprising a noble metal element,
   wherein, in the pyrochlore-type $CeO_2$—$ZrO_2$-based complex oxide, a mole percentage $R_2$ of a total content of Y and Mg to a total content of Ce, Zr, Y and Mg is 5.5% by mole or more and 20% by mole or less, and a mole ratio $R_3$ of a content of Mg to a content of Y is 0.1 or more and 2.6 or less, and
   wherein the composition is a composition for producing an exhaust gas purification catalyst comprising the pyrochlore-type $CeO_2$—$ZrO_2$-based complex oxide, and the catalytically-active component supported on the pyrochlore-type $CeO_2$—$ZrO_2$-based complex oxide.

2. The composition according to claim 1, wherein, in the pyrochlore-type $CeO_2$—$ZrO_2$-based complex oxide, a mole percentage $R_0$ of a total content of Ce, Zr, Y and Mg to a total content of all metal elements contained in the pyrochlore-type $CeO_2$—$ZrO_2$-based complex oxide is 80% by mole or more.

3. The composition according to claim 1, wherein, in the pyrochlore-type $CeO_2$—$ZrO_2$-based complex oxide, a mole percentage $R_1$ of a content of Mg to a total content of Ce, Zr, Y and Mg is 0.5% by mole or more and 15% by mole or less.

4. The composition according to claim 1, wherein the mole ratio $R_3$ is 0.3 or more and 2.3 or less.

TABLE 1

| | Pyrochlore CZ Powder | | | | | | | | | Pd-supported Pyrochlore CZ Powder OSC Performance | | Catalyst Structure THC |
|---|---|---|---|---|---|---|---|---|---|---|---|---|
| | Composition (% by mole) | | | | | Mg/Ce (mole ratio) | Zr/Ce (mole ratio) | Y + Mg (% by mole) | Mg/Y (mole ratio) | Relative value | Evaluation | Purification Efficiency (%) |
| | Ce | Zr | Y | Mg | Ca | | | | | | | |
| Example 1 | 47.4 | 46.6 | 5.1 | 0.9 | — | 0.019 | 0.983 | 6.0 | 0.2 | 1.13 | C | — |
| Example 2 | 47.0 | 46.3 | 5.0 | 1.7 | — | 0.036 | 0.985 | 6.7 | 0.3 | 1.24 | B | — |
| Example 3 | 46.6 | 45.9 | 5.0 | 2.5 | — | 0.054 | 0.985 | 7.5 | 0.5 | 1.25 | B | — |
| Example 4 | 43.8 | 45.0 | 5.0 | 6.2 | — | 0.141 | 1.027 | 11.2 | 1.2 | 1.28 | B | — |
| Example 5 | 43.8 | 45.0 | 5.0 | 6.2 | — | 0.141 | 1.027 | 11.2 | 1.2 | 1.30 | A | 92.4 |
| Example 6 | 43.8 | 43.7 | 6.4 | 6.0 | — | 0.137 | 0.998 | 12.4 | 0.9 | 1.21 | C | — |
| Example 7 | 43.0 | 44.2 | 4.9 | 7.9 | — | 0.184 | 1.028 | 12.8 | 1.6 | 1.25 | B | — |
| Example 8 | 42.5 | 41.9 | 4.5 | 11.1 | — | 0.261 | 0.986 | 15.6 | 2.4 | 1.15 | C | — |
| Comparative Example 1 | 47.8 | 47.1 | 5.1 | — | — | — | 0.985 | 5.1 | — | 1.00 | D | 90.6 |
| Comparative Example 2 | 46.9 | 47.7 | — | 5.4 | — | 0.115 | 1.017 | 5.4 | — | 1.08 | D | — |
| Comparative Example 3 | 44.9 | 44.3 | 4.8 | — | 6.0 | — | 0.987 | 4.8 | — | 1.08 | D | — |

5. The composition according to claim 4, wherein the mole ratio $R_3$ is more than 1.0 and 2.0 or less.

6. The composition according to claim 1, wherein, in the pyrochlore-type $CeO_2$—$ZrO_2$-based complex oxide, a mole ratio $R_4$ of a content of Mg to a content of Ce is 0.01 or more and 0.3 or less.

7. The composition according to claim 1, wherein, in the pyrochlore-type $CeO_2$—$ZrO_2$-based complex oxide, a mole ratio $R_5$ of a content of Zr to a content of Ce is 0.85 or more and 1.15 or less.

8. An exhaust gas purification catalyst, comprising:
    a pyrochlore-type $CeO_2$—$ZrO_2$-based complex oxide comprising Y and Mg; and
    a catalytically-active component comprising a noble metal element, the catalytically-active component being supported on the pyrochlore-type $CeO_2$—$ZrO_2$-based complex oxide,
    wherein, in the pyrochlore-type $CeO_2$—$ZrO_2$-based complex oxide, a mole percentage $R_2$ of a total content of Y and Mg to a total content of Ce, Zr, Y and Mg is 5.5% by mole or more and 20% by mole or less, and a mole ratio $R_3$ of a content of Mg to a content of Y is 0.1 or more and 2.6 or less.

9. The exhaust gas purification catalyst according to claim 8, wherein, in the pyrochlore-type $CeO_2$—$ZrO_2$-based complex oxide, a mole percentage $R_0$ of a total content of Ce, Zr, Y and Mg to a total content of all metal elements contained in the pyrochlore-type $CeO_2$—$ZrO_2$-based complex oxide is 80% by mole or more.

10. The exhaust gas purification catalyst according to claim 8, wherein, in the pyrochlore-type $CeO_2$—$ZrO_2$-based complex oxide, a mole percentage $R_1$ of a content of Mg to a total content of Ce, Zr, Y and Mg is 0.5% by mole or more and 15% by mole or less.

11. The exhaust gas purification catalyst according to claim 8, wherein the mole ratio $R_3$ is 0.3 or more and 2.3 or less.

12. The exhaust gas purification catalyst according to claim 11, wherein the mole ratio $R_3$ is more than 1.0 and 2.0 or less.

13. The exhaust gas purification catalyst composition according to claim 8, wherein, in the pyrochlore-type $CeO_2$—$ZrO_2$-based complex oxide, a mole ratio $R_4$ of a content of Mg to a content of Ce is 0.01 or more and 0.3 or less.

14. The according exhaust gas purification catalyst to claim 8, wherein, in the pyrochlore-type $CeO_2$—$ZrO_2$-based complex oxide, a mole ratio $R_5$ of a content of Zr to a content of Ce is 0.85 or more and 1.15 or less.

15. The exhaust gas purification catalyst according to claim 8,
    wherein the exhaust gas purification catalyst comprises a substrate, and a catalyst layer formed on the substrate, and
    wherein the catalyst layer comprises the pyrochlore-type $CeO_2$—$ZrO_2$-based complex oxide, and the catalytically-active component supported on the pyrochlore-type $CeO_2$—$ZrO_2$-based complex oxide.

* * * * *